Sept. 1, 1942.  E. U. GUEST  2,294,551
AUTOMATIC WEIGHING MACHINE
Filed Nov. 29, 1940  2 Sheets-Sheet 2
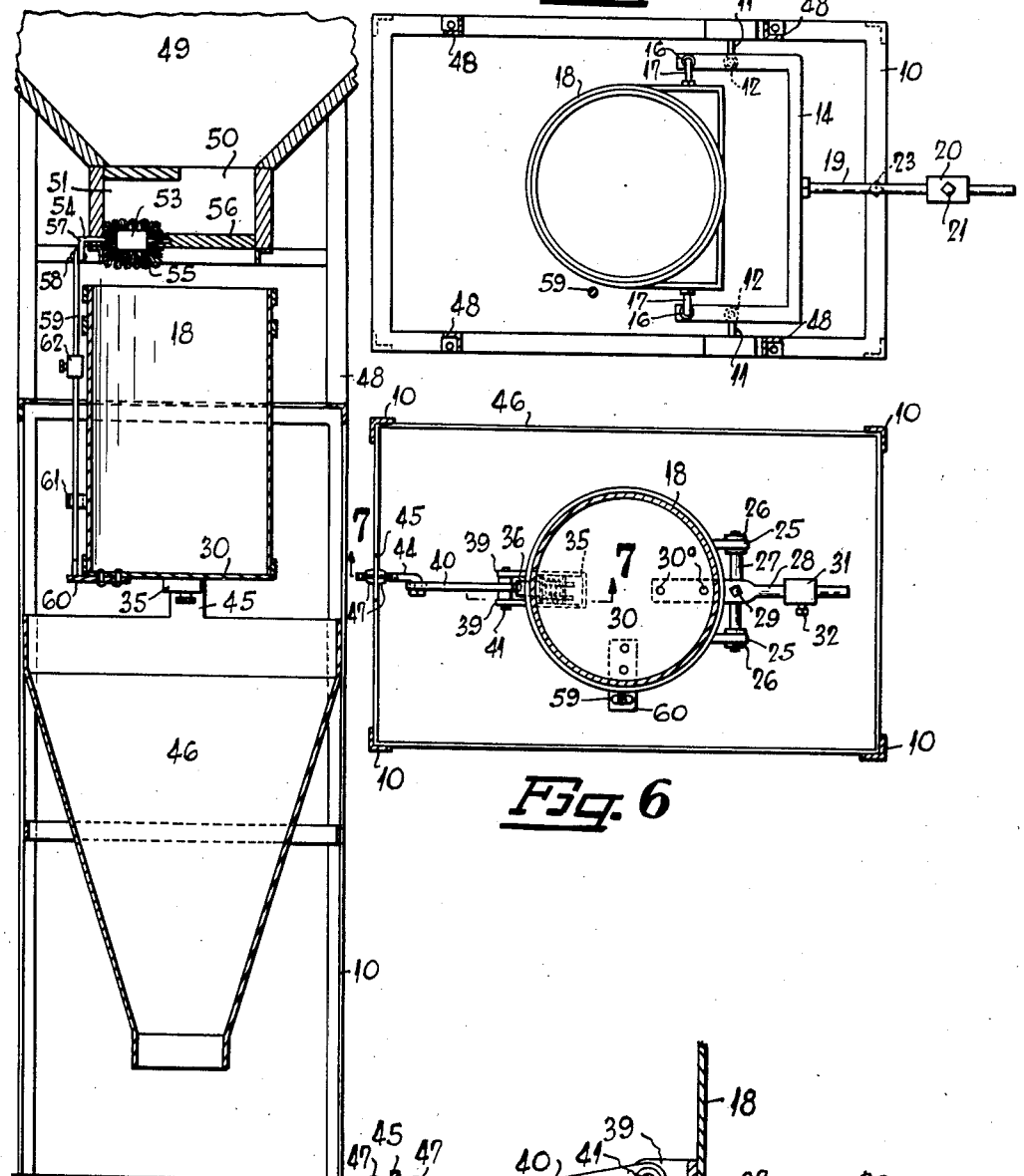
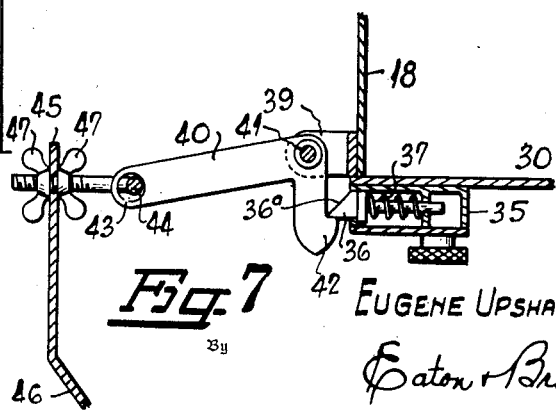
Inventor:
EUGENE UPSHAW GUEST
By Eaton & Brown
Attorneys Patented Sept. 1, 1942

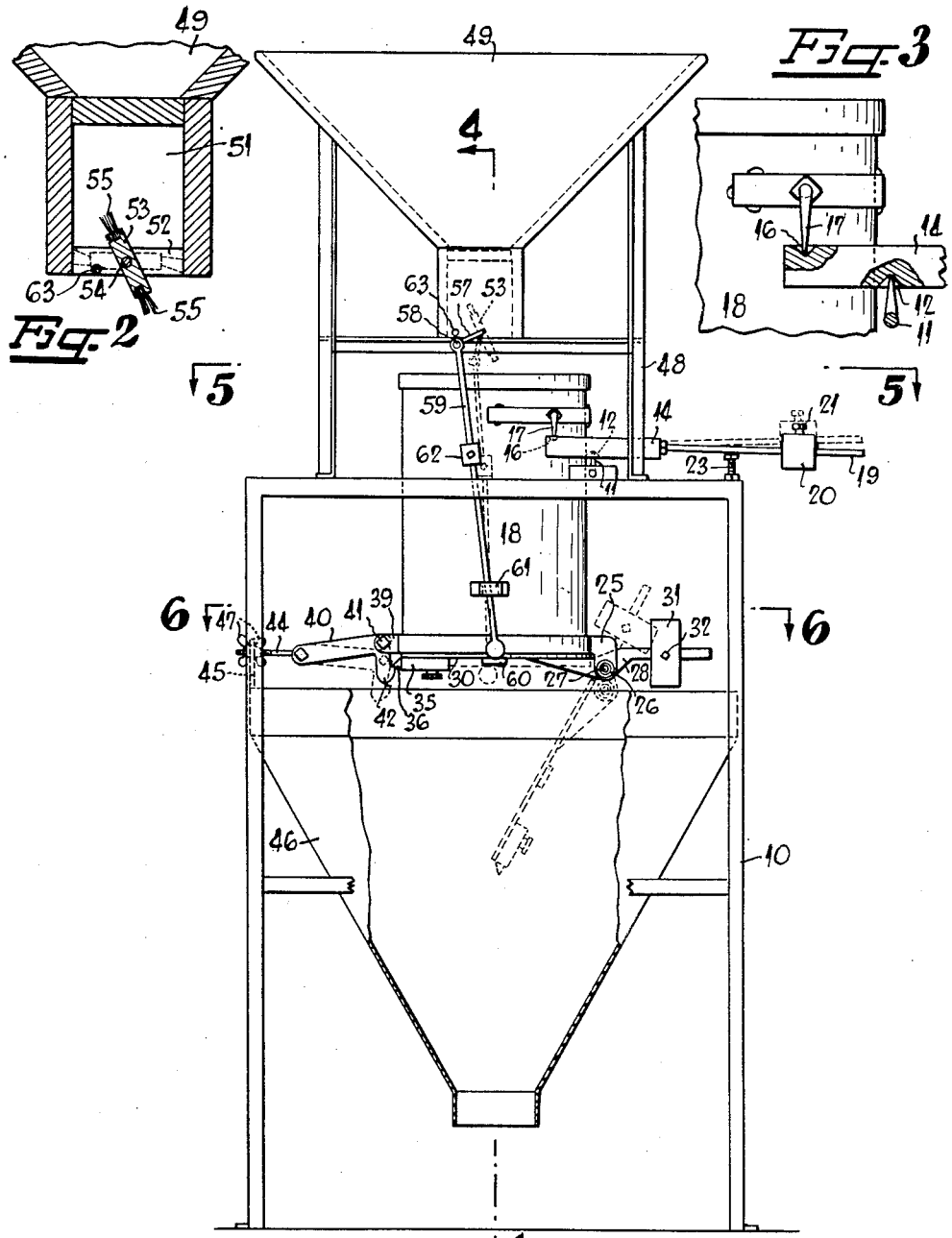

2,294,551

UNITED STATES PATENT OFFICE 2,294,551

AUTOMATIC WEIGHING MACHINE

Eugene Upshaw Guest, Charlotte, N. C.

Application November 29, 1940, Serial No. 367,730

1 Claim. (Cl. 249—53)

This invention relates to an automatic weighing machine which is capable of successively weighing and emptying predetermined quantities of material such as grain, flour, or other pulverized materials. More specifically the invention comprises a weighing machine of the class described having an improved hopper construction for regulating the flow of the unweighed material into the weighing container, and also comprises an improved unlatching means for releasing the bottom of the container for emptying purposes.

It is an object of this invention to provide a weighing machine equipped with a hopper for holding the unweighed material, said hopper having a gate in the lower portion thereof adapted to be moved gradually to closed position by the downward movement of the container and suddenly closed by the opening of the container bottom. The gate in the lower portion of the hopper regulates the flow of unweighed material into the weighing container, hence it is necessary to instantly cut off the flow of unweighed material when a predetermined amount of material has been deposited in the container. Likewise it is desirable to have as short a time interval as possible between the cessation of flow of material from the hopper and the unlatching of the container bottom, therefore the present embodiment of the invention contemplates controlling the closing of the hopper valve by the opening of the container bottom to release the contents therefrom, the moment the correct amount is in the container.

It is another object of this invention to provide a weighing apparatus of the class described having an improved offset hopper throat construction especially designed to relieve the gate in the lower portion thereof from the weight of the unweighed material. This feature is particularly important in the present invention because the structure is such that a relatively small force must actuate the hopper gate to cause it to be quickly closed.

Another object of this invention is to provide a weighing machine which is simple in construction, economical to manufacture, efficient in operation and which can be placed upon the market at a price within easy reach of the users.

Some of the objects of the invention having been stated, other objects will appear as the description proceeds when taken in connection with the accompanying drawings, in which—

Figure 1 is an elevation of my improved automatic weighing machine showing certain portions broken away and other portions shown in section;

Figure 2 is a sectional view through the lower portion of the delivery hopper which is employed for holding unweighed material, said view showing the gate in the lower portion thereof in bold line opened position and in dotted line closed position;

Figure 3 is an enlarged sectional view showing the means for mounting the weighing container on the balance beam;

Figure 4 is a vertical sectional view taken along the line 4—4 in Figure 1;

Figure 5 is a sectional plan view taken along the line 5—5 in Figure 1;

Figure 6 is a sectional plan view taken along the line 6—6 in Figure 1;

Figure 7 is a sectional detail view taken along the line 7—7 in Figure 6, showing the means for latching the container bottom in closed position.

Referring more specifically to the drawings, the numeral 10 denotes a framework which supports a pair of fulcrum points 11, there being one fulcrum member upon each side of the frame. The pointed ends of members 11 are adapted to rest in suitable cavities 12 in the lower portion of U-shaped member 14, said U-shaped member having similar cavities 16 in the upper portion thereof for accommodating suitable pointed members 17 which support the opposed sides of a weighing container 18. Integral with the intermediate portion of the U-shaped member 14 is a rod 19 upon which is adjustably mounted a weight 20 by any suitable means such as a set screw 21, the members 14 and 19 forming a balance beam. Since the weighing container is supported by the members 17, which, in turn, rests a substantial distance to the left of the fulcrum points 11 (Figure 1), it is necessary to locate the weight member 20 upon the rod 19 to the right of points 11 so that the container will be properly counterbalanced. Usually the weight 20 is placed a sufficient distance from the fulcrum point 11 to not only counterbalance the container, but also to counterbalance a predetermined load which the container is supposed to carry before tilting the balance bar. Normally before the tilting, rod 19 is supported by a suitable bolt 23 which is adjustably secured in the upper portions of framework 10. By adjusting the height of bolt 23, the amount of tilt of the balance bar which is necessary to unlatch the container bottom may be varied. This unlatching mechanism will be later described.

The lower portion of a container 18 has a pair of lugs 25 extending therefrom, said lugs being adapted to accommodate suitable bearings 26 preferably of the ball type. These bearings, in turn, support a rod 27, upon which a lever 28 is adjustably secured by means of a set screw 29. One end of the lever 28 has secured thereto a bottom 30 as at 30a (see Figure 6); whereas the other end of the lever 28 has adjustably secured thereon a weight 31 by means of set screw 32. The weight 31 is disposed from shaft 27 a sufficient distance to counterbalance the bottom 30 and cause it to be normally held in closed position when there is no material disposed therein. By providing suitable antifriction bearings 26 and also by providing spaced lugs 25, it has been found that the bottom 29 can operate more efficiently with the other elements of the invention without binding.

The free end of the bottom 30 (see Figures 1, 6 and 7) has secured to the lower end thereof a suitable latch housing 35 in which is slidably mounted a latch 36 having a beveled surface 36a. A compression spring 37 normally forces the latch member 36 to extended position as shown in the drawings. When the bottom 30 is being closed, this beveled surface 36a is adapted to engage a relatively stationary companion member 42 and be forced inwardly, against the resistance of spring 37.

Suitable lugs 39 extend from the side of the container 18 and near the bottom thereof. Between these lugs, a suitable bar 40 is pivoted intermediate its ends as at 41. This bar has a notched projection 42 integral therewith which is adapted to extend beneath the latch 36 and hold the bottom 30 in closed position in the manner shown in Figure 7. The other end of the bar 40 has an enlarged hole 43 which fits around bolt 44, said bolt being adjustably mounted in the upper portion 45 of hopper 46 by any suitable means such as wing nuts 47. It is therefore seen that the latch bar 40 is pivoted near one end to stationary bolt 44 and at the other end as at 41 to the lower portion of the container 18. When sufficient material is emptied into the container 18 to cause the balance bars 14 and 19 to tilt to dotted line position as shown in Figure 1, the container 18 will move downwardly. Since the container will swing through a slight arc about fulcrum points 11, it is necessary to provide a small amount of play between the bolt 44 and the bar 40, so that the container will remain substantially in a vertical position. This play is provided by the enlarged hole 43. Of course as the container moves down, the bar 40 will rotate downwardly about the bolt 44 thereby causing the free end of the bar to rotate about pivot point 41 which in turn will cause the projection 42 to rotate from beneath the latch 36 to allow the material to open the bottom 30 and cause it to swing to dotted line position as shown in Figure 1. When this is done the contents will empty into the hopper 46.

The time of unlatching and latching of the container bottom 30 can be varied by manipulating nuts 47 and repositioning bolt 44. This adjustment should be used in conjunction with balance bar adjustment bolt 23 previously described.

It is necessary that the supply hopper which contains the unweighed material be provided with a suitable gate which is adapted to be automatically closed when the bottom of the container opens. In the present embodiment of the invention the framework 10 is provided with a suitable support or stand 48, said stand in turn supporting a supply hopper 49. This hopper has sidewalls which converge as they progress downwardly, and an opening 50 is provided in the lower portion thereof through which the materials flow (Figure 4). This opening might be properly termed as the entrance of a conduit. From the opening 50, the conduit extends substantially in a horizontal direction for a slight distance, forming a pocket 51. The conduit or passageway has an opening 52 in the lower portion thereof directly below the pocket 51. In this opening, a suitable gate or vane 53 is rotatably mounted upon a horizontal rod 54. It will be noted that this gate has its entire periphery lined with suitable flexible material such as bristles 55 which are adapted to yieldingly contact the side walls of the opening 52 when the gate is in closed position. These bristles prevent binding of the parts which often occurs when a piece of material wedges between the gate and the sidewalls of the opening in which the gate is located.

It will be noted that the gate 53 is located in offset relation to the opening 50. In other words, the material flows downwardly through the opening 50 and is supported by the lower portion of the conduit as at 56. The material in the hopper being such as will readily flow, will naturally creep laterally into pocket 51 and downwardly through the opening 52 when the gate 53 is in open or in bold line position as shown in Figure 2.

The rod 54 extends to the exterior of the hopper and has a bell crank 57 integral with one end thereof to which is pivoted as at 58 the upper end of a rod 59, said rod extending downwardly alongside the container 18 and having the lower end thereof resting upon a suitable projection 60 which extends from the bottom 30. A suitable collar or loop 61 is provided on the container 18 for holding the lower portion of the rod 59 in the proper position for contacting the projection 60. Also a member 62 is provided upon the rod 59 for supplying the necessary weight to actuate the gate 53 and move it to closed position when the bottom 30 is released.

*Method of operation*

The unweighed material is placed in the hopper 49 from which it flows downwardly into opening 50 and then laterally into pocket 51. With the container bottom 30 closed as shown in Figure 1 in bold lines, the gate 53 will be disposed in a substantially vertical position to permit the material to flow from the pocket 51 downwardly through opening 52 and into the container 18. The material continues to flow until a sufficient amount is disposed in the container to counterbalance the weight 20 and cause the balance bars 14 and 19 to move upwardly to dotted line position in Figure 1. As the container 18 moves downwardly the valve 53 will gradually close as the bar 40 rotates about its pivots 44 and 41, thereby releasing the projection 42 from the latch 36 and allowing the bottom 30 to suddenly open to dotted line position. When the bottom starts opening, the support 60 for the rod 59 will be removed and, consequently, the weight of the rod together with the added weight 62 will fall downwardly thereby rotating the bell crank 57 and the gate 53 to dotted line closed position as shown in Figure 2.

As the material empties from the container 18 the weight 29 will return the container to normal bold line position. Also when the material has emptied, the weight 31 will rotate the bottom 30 back to normal closed position. As the container moves upwardly, the notched projection 42 will be rotated inwardly towards the center of the container to a position where the latch 46 will engage the same and be held thereby in latched position. Of course, when the container bottom 30 moves upwardly to bold line closed position, the lower portion of the rod 59 will be engaged by member 60 to thereby rotate the bell crank 57 and its associated gate 53 to open position to permit material to again flow into the container from the supply hopper.

Gate 53 is provided with a stop 63 so that bell crank 57 will not be caught on dead center when the gate 53 is closed.

In the drawings and specification there has been set forth a preferred embodiment of the invention and although specific terms are employed, they are used in a generic and descriptive sense only and not for purposes of limitation, the scope of the invention being set forth in the appended claim.

I claim:

Apparatus for weighing loose bulk materials, comprising a framework, a hopper disposed in the upper portion of the framework and having an opening in the lower portion thereof, a gate for closing said opening, a bell crank on said gate and a downwardly depending weighted member attached at its upper end to said bell crank, a weighing lever, a fulcrum on the frame for supporting an intermediate portion of said weighing lever, a container disposed below the hopper and being pivotally supported by one end of said weighing lever, said weighing lever having a counterweight on the other end thereof, a bottom for said container pivoted to one side of the container and weighted means for normally holding the bottom in closed position, means on the bottom for engaging said weighted member associated with said bell crank for holding the gate in open position when the bottom is in closed position, a bell crank latch member pivoted to said container adjacent the free side of said bottom, said bottom having a latch thereon and said bell crank latch having a projection thereon for engaging said latch and holding the bottom in closed position, the other end of said bell crank latch having an enlarged hole therein, a bolt of substantially smaller size than the hole and having one end positioned within the hole the other end of the bolt being adjustably mounted in the framework, whereby when a predetermined amount of material has moved from the hopper into the container, the container will be moved downwardly slowly to allow the weighted member to partially close the gate, the enlarged hole in said bell crank latch allowing the container to move downwardly a substantial amount to partially close said opening before the bottom is unlatched to dump the contents of the container.

EUGENE UPSHAW GUEST.